United States Patent [19]

Sander

[11] Patent Number: 5,514,310
[45] Date of Patent: May 7, 1996

[54] METHOD OF FOAMING PRIOR TO INJECTION MOLDING

[76] Inventor: Daniel G. Sander, 2024 Ferry Rd., Grand Island, N.Y. 14072

[21] Appl. No.: 217,553

[22] Filed: Mar. 25, 1994

[51] Int. Cl.⁶ .................................................. B29C 44/02
[52] U.S. Cl. ........................ 264/37; 264/50; 264/328.1; 264/DIG. 69
[58] Field of Search ................. 264/50, 37, DIG. 69, 264/328.6, 51, 53, 54, 328.1

[56] References Cited

U.S. PATENT DOCUMENTS

| | | | |
|---|---|---|---|
| 3,981,649 | 9/1976 | Shimano et al. | 264/50 |
| 4,043,715 | 8/1977 | Hendry | 264/50 |
| 4,211,523 | 7/1980 | Hunerberg | 264/50 |
| 4,255,368 | 3/1981 | Olabisi | 264/50 |
| 4,409,164 | 10/1983 | Brasz et al. | 264/50 |
| 4,548,776 | 10/1985 | Holdredge, Jr. | 264/50 |
| 4,824,627 | 4/1989 | Hammer et al. | 264/DIG. 69 |
| 4,824,732 | 4/1989 | Hendry et al. | 264/50 |
| 4,942,006 | 7/1990 | Loren | 264/50 |
| 5,098,267 | 3/1992 | Cheng | 264/50 |
| 5,124,095 | 6/1992 | Gianni et al. | 264/50 |

*Primary Examiner*—Allan R. Kuhns
*Attorney, Agent, or Firm*—Hodgson, Russ, Andrews, Woods & Goodyear

[57] ABSTRACT

An injection molding machine or extruder 10 for injecting a foamed thermoplastic material 82 into a mold 12 for forming a shaped article at a relatively low pressure. The injection molding machine comprises a barrel 20 housing a screw 22 disposed in a relatively loose clearance with respect to an inner surface 24 of the barrel. This loose clearance provides for churning a molten thermoplastic material into a foamed condition, which is then introduced into a mold. As the thermoplastic material cools, its foamed characteristic retards shrinkage of the thermoplastic material.

12 Claims, 3 Drawing Sheets

METHOD OF FOAMING PRIOR TO INJECTION MOLDING

BACKGROUND OF THE INVENTION

1. Field of the Invention

The present invention relates to a plastic molding process using an injection molding machine or extruder. In particular, the present invention is directed to a low pressure injection molding machine and a process for forming a shaped article by injecting a foamed thermoplastic polymeric resin formed in the machine into a mold at a relatively low pressure according to the present invention using the present injection molding machine. The foamed characteristic retards shrinkage of the shaped article as the thermoplastic material cools, and the process can be carried out using waste or used thermoplastic material.

2. Prior Art

In conventional high pressure injection molding machines, a molten thermoplastic material is injected into a mold at a very high pressure, i.e., upwards of several thousand pounds per square inch. This pressure is maintained on the mold as the plastic cools and the high pressure retards shrinkage of the thermoplastic material to an appreciable amount. The problem is that high pressure molds are very expensive.

SUMMARY OF THE INVENTION

The injection molding machine or extruder of the present invention comprises a cylindrically shaped barrel housing a screw disposed in a relatively loose clearance with respect to an inner surface provided by the barrel. Particulate thermoplastic material, advantageously ground or otherwise formed from used or waste thermoplastic material, is fed into the barrel through a hopper and moved along the barrel passage towards a downstream discharge nozzle by action of the rotating screw. During this advancing movement, the temperature of the thermoplastic material is increased by means of heaters that surround the barrel and cause the thermoplastic material to be reduced to a molten state. The loose clearance between the screw and the inner surface of the barrel enables a portion of the advancing molten thermoplastic material to tumble or churn past the flights comprising the screw. This tends to foam the molten thermoplastic material and results in the extruder operating at a relatively low pressure, i.e., less than about 250 psi. At such a low pressure, the molten thermoplastic material essentially pours from the discharge nozzle of the molding machine.

The discharged molten thermoplastic material can then be treated further by casting into a mold and letting the thermoplastic material cool to a hardened state to obtain a shaped article. The foamed condition of the molten thermoplastic material tends to minimize the amount of shrinkage of the shaped article with the air bubbles inflating against the mold. The low pressure operation provides the advantage of reduced cost because use of expensive high pressure injection molding apparatus is avoided. This cost reduction advantage is enhanced by the capability of the process and apparatus using waste or used thermoplastic material as the starting product. The process and apparatus is particularly advantageous in manufacturing generally U-shaped channel articles for use in trench drain systems.

The foregoing and additional advantages and characterizing features of the present invention will become clearly apparent upon a reading of the ensuing detailed description together with the included drawing wherein:

DETAILED DESCRIPTION OF THE PREFERRED EMBODIMENT

Figure 1:
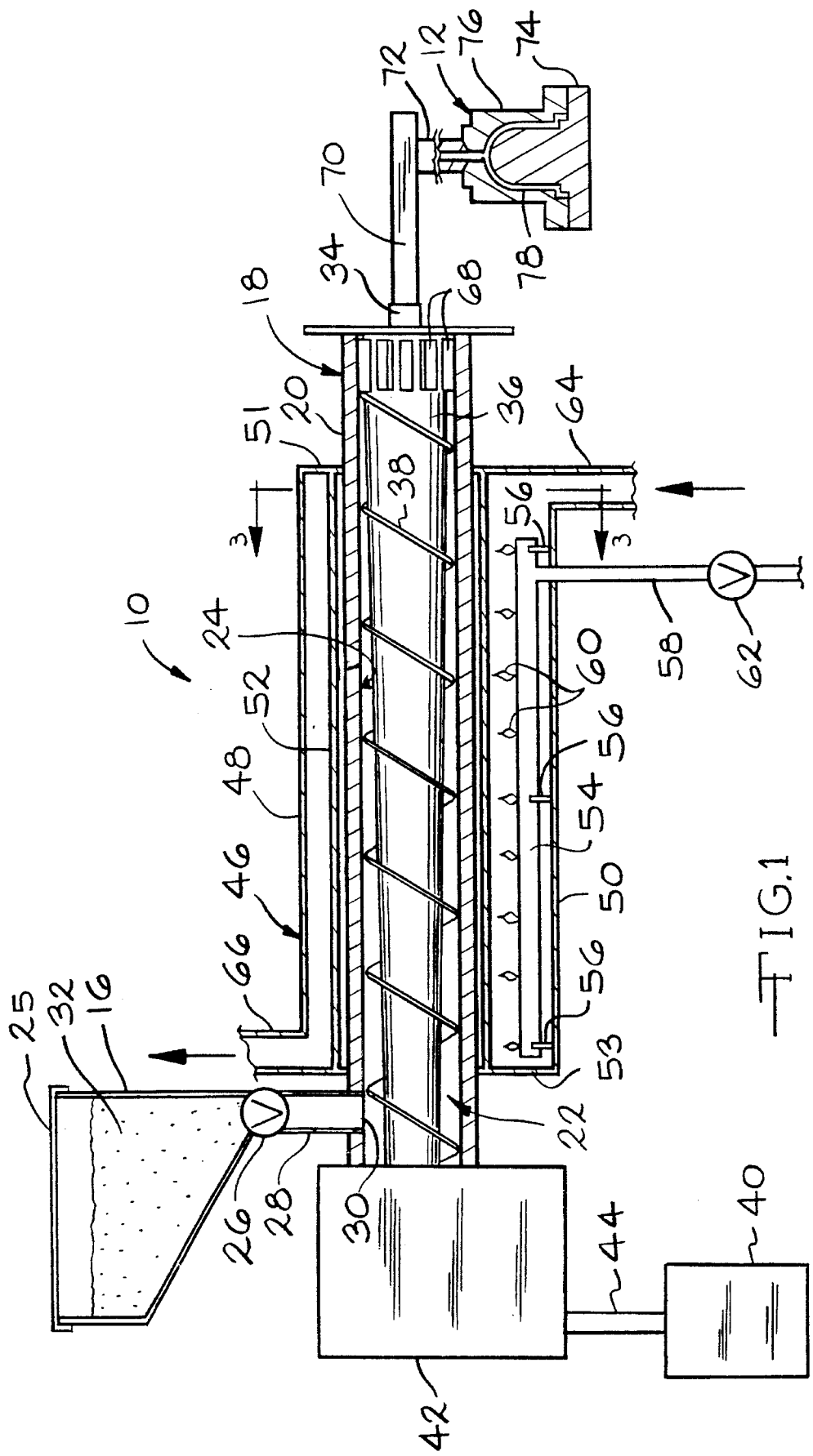
FIG. 1 is a cross-sectional view with parts removed and partly diagrammatic of an injection molding machine or extruder 10 of the present invention and an associated mold 12 for forming a shaped article.

Referring now to the drawings, FIGS. 1 to 4 show the low pressure injection molding machine or extruder 10 of the present invention and an associated mold 12 for forming a shaped article such as a U-shaped channel 14 (FIG. 5) for use in a trench drain system (not shown). It should be understood that a myriad of different kinds of shaped articles can be formed by use of the molding machine 10 of the present invention and that channel 14 is only representative of them. The only limitation in terms of the variety of shaped articles that can be made by use of the present molding machine 10 is that the shaped article is formed by injecting a foamed thermoplastic material into a suitable mold at a relatively low pressure. This process will be explained in detail presently.

As particularly shown in FIG. 1, the injection molding machine 10 includes a hopper 16 and an injector unit 18 which comprises a cylindrically shaped barrel 20 having a rotatable screw 22 disposed inside a longitudinal, cylindrical passage provided by the interior of barrel 20. Screw 22 is provided in a relatively loose clearance with respect to the inner surface 24 of barrel 20, as indicated by arrows 23 in FIG. 3. Clearance 23 is preferably a distance of between about 0.1875 inches to 0.5 inches, and more preferably about 0.25 inches. The significance of this clearance will be explained in detail presently.

Hopper 16 comprises a funnel shaped receptacle having an open upper end closed by a removable cover 25. A lower outlet is controlled by a valve 26 and leads to a feed conduit 28 that communicates with an inlet opening 30 at the upstream end of barrel 20 comprising the injector unit 18. Hopper 16 serves to receive, store and gravity feed particulate thermoplastic material 32 out through the lower hopper outlet and into the feed conduct 28 by appropriate actuation of valve 26. Cover 25 is removably fitted over the open end of hopper 16 to provide for filling hopper 16 and to prevent contamination of the thermoplastic material 32.

Injector unit 18 includes barrel 20 which defines a longitudinal passage provided between the upstream inlet opening 30 and a distal downstream discharge nozzle 34. In particular, the diameter of shaft 36 increases gradually from the proximal end to the distal end. Screw 22 is rotatably positioned inside barrel 20 and comprises a shaft 36 having a frusto-conical shape tapering outwardly along the longitudinal axis thereof from a proximal end of shaft 36 positioned adjacent to the inlet opening 30 to a distal end positioned adjacent to discharge nozzle 34. In particular, the diameter of shaft 36 increases gradually from the proximal end to the distal end. Shaft 36 carries helically shaped flutes or flights 38 beginning at the proximal end and continuing along the widening taper thereof towards the discharge nozzle 34, ending proximate a plurality of bar shaped members 68. Bars 68 are mounted on the distal end of shaft 36 in a spaced apart relationship with respect to each other and with their respective axes parallel to the longitudinal axis of shaft 36°. Screw 22 is actuated by a variable-speed engine, indicated by block 40 in FIG. 1, which drives a gear mechanism, indicated by block 42, for the screw 22 via a drive shaft 44.

Figure 3:
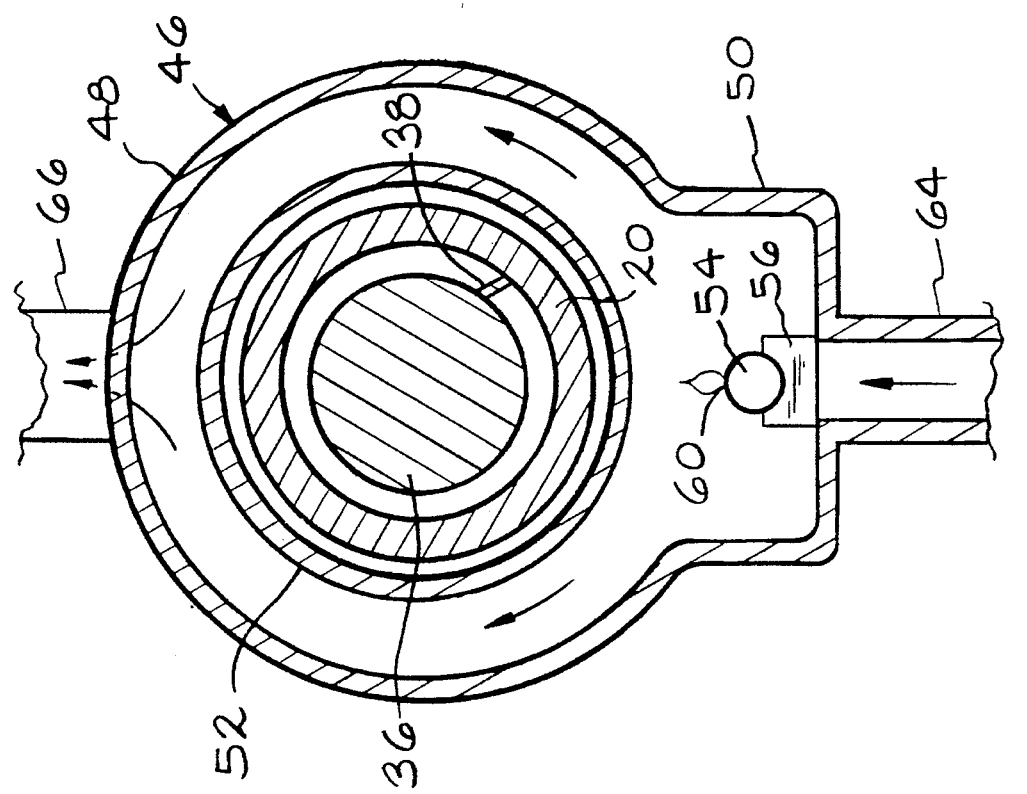
FIG. 3 is a cross-sectional screw along line 3—3 of FIG. 1.

As shown in FIGS. 1 and 3, an annular jacket 46 surrounds the major portion of the length of barrel 20 between the inlet opening 30 and the distal portion of barrel 20. Jacket 46 comprises an outer side wall 48 having a generally cylindrical shape joined to a lower channel shaped portion 50 with both side wall 48 and channel 50 extending to and meeting with opposed end walls 51 and 53 to forman outer enclosure. An inner annular side wall 52 is disposed coaxially inside side wall 48 and is also closed by end walls 51 and 53 to complete jacket 46. An internal heating manifold 54 is disposed inside channel 50, supported by a plurality of spaced apart legs 56. Manifold 54 comprises a plurality of burners 60 positioned at spaced intervals along the length thereof which are supplied with natural gas from a gas line 58 controlled by valve 62. An air inlet line 64 enters channel 50 adjacent to the distal end of barrel 20 and serves to support combustion inside jacket 46 and thereby distribute heat around the entire annular extent of barrel 20. A flue line 66 exhausts hot gases from jacket 46 adjacent to the upstream end of barrel 20.

In use, the ascending flights 38 on shaft 36 comprising screw 22 serve to convey the particulate thermoplastic material 32 fed from hopper 16 at the inlet opening 30 thereof corresponding to a feed zone in barrel 20 and then to a middle zone where the particulate thermoplastic material 32 gradually softens and fuses into a molten state (not shown) due to the heat provided by jacket 46. The thermoplastic material is preferably heated to a temperature of between about 400° F. to about 500° F., and more preferably to about 450° F. for polyolefins such as polypropylene and polyethylene. The thermoplastic material is reduced to its molten state to a lesser extent by the shearing action of the screw 22.

Figure 2:
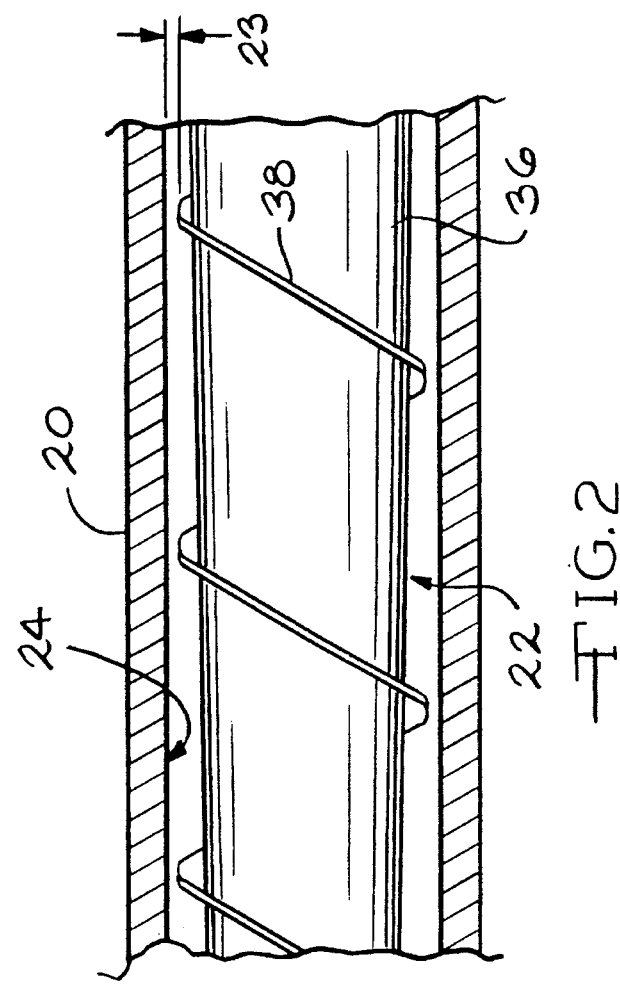
FIG. 2 is an enlarged fragmentary sectional view of a screw 22 housed in a relatively loose clearance inside a cylindrically shaped barrel 20 of the molding machine 10 shown in FIG. 1.

As shown in FIGS. 1 and 2, the flights 38 on shaft 36 are provided in the relatively loose clearance 23 with respect to the inner surface 24 of barrel 20 while the flights 38 ascend along the length of shaft 36. In that respect, the ascending flights 38 gradually become less and less pronounced as the taper of shaft widens towards the discharge nozzle 34. The loose clearance 23 between the flights 38 and the inner surface 24 of barrel 20 tends to foam the thermoplastic material 32 as the thermoplastic material becomes molten. In particular, the material 32 shifts back and forth along shaft 36 due to the action of flights 38 which creates the foaming at the same time, the widening taper of shaft 36 tends to thin the annular volume of molten thermoplastic material in the middle or churning zone as the thermoplastic material moves to a blending zone where the action of bars 68 serves to homogenize the churned thermoplastic material. The churned and blended thermoplastic material then moves to the open discharge nozzle 34 to cast out of the barrel 20 in a low pressure pour.

Figure 4:
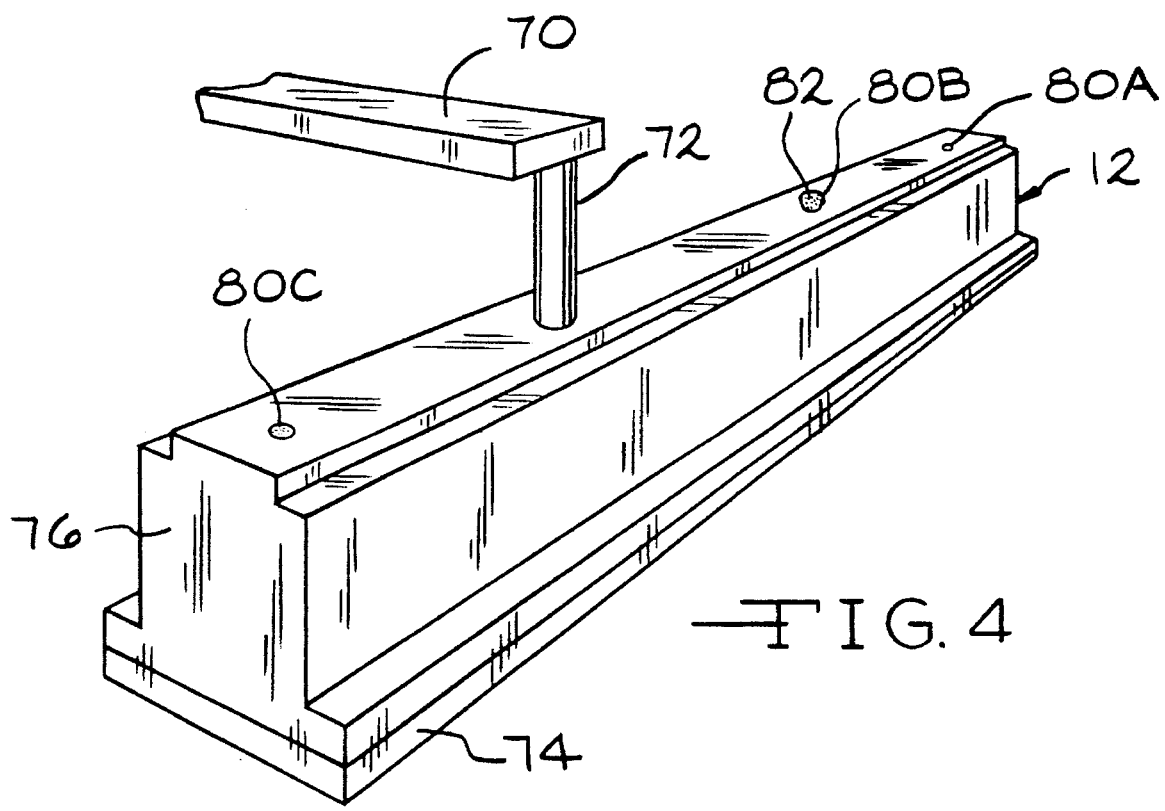
FIG. 4 is a perspective view of the mold 12 shown in FIG. 1 receiving molten thermoplastic material 82 from the output of the injection molding machine 10.

As shown in FIGS. 1 and 4, discharge nozzle 34 connects to a pivotable arm 70 having a depending feeder conduit 72. Mold 12 comprises a lower platen 74 and an upper platen 76 that are secured together by suitable means to provide a cavity 78 (FIG. 1) having the shape of the article to be formed by the molding process of the present invention, such as the trench drain channel 14 shown in FIG. 5. The upper platen 76 is provided with a plurality of openings 80A to 80C (an opening between those indicated as 80B and 80C is not labeled as it is covered by conduct 72 in FIG. 4) spaced along the length thereof and in communication with the cavity 78 provided inside mold 12.

In use, feeder conduit 72 is mated with one of the openings 80A to 80C while molten thermoplastic material is moved along the barrel 20 of molding machine 10 by rotary action of screw 22 to thereby cause the molten thermoplastic material to pour through the discharge nozzle 34 at a relatively low pressure, i.e., less than about 250 psi and preferably at about 100 psi or less. Feeder conduit 72 is initially held mated to the first opening 80A until such time as molten thermoplastic material 82 begins to ooze up and out from the next adjacent opening 80B. Feeder conduit 72 is then removed from the first opening 80A and mated to the opening 80B having the thermoplastic material 82 oozing therefrom. This procedure is continued with feeder conduit 72 being mated to each successive opening to thereby fill that portion of the mold cavity 78 in direct communication with the respective opening until the entire cavity 78 has been filled with molten thermoplastic material. The thermoplastic material is preferably at a temperature of about 450° F. for a polyolefin while mold 14 is at a temperature of between about 100° F. to about 160° F. and preferably at about 120° F.

In any molding process, there will be some degree of shrinkage of the thermoplastic material as it cools. However, in the present molding process, the relatively loose clearance 23 between screw 22 and the inner surface 24 of barrel 20 tends to churn the molten thermoplastic material which flows out through the discharge nozzle 34 as a somewhat foamed thermoplastic material. The relatively low operating pressure of molding machine 10 maintains this foamed condition so that as the thermoplastic material cools in mold 14, the foaming action helps reduce the degree of cooling induced shrinkage to a significant extent to thereby provide a trench drain channel 14 dimensioned similar to that of mold cavity. It is believed that the foamed thermoplastic material tends to inflate in mold 12 rather than shrink as is the usual case when hot plastic material contacts a relatively lower temperature mold surface. This, in turn, enables more thermoplastic material to be pumped or otherwise forced into the voids in the thermoplastic material already in mold 12 thereby filling up the space in mold 12 completely.

At such time as the thermoplastic material has cooled to a sufficient degree so that the thusly formed channel 14 will retain its structured integrity, the platens 74 and 76 are opened. Channel 14 is removed from the opened mold 12 and the platens 74 and 76 are reassembled to provide the mold 12 having the empty cavity 78 ready to accept another charge of molten thermoplastic material made according to the process of the present invention.

Channel 14 comprises a generally elongate U-shaped body portion 84 having L-shaped rails 86 and 88 extending outwardly and upwardly from an upper edge of portion 84. In use, channel 14 is suitably connectable to other channel members positioned at either end of channel 14 to thereby form a trench drain system, as is well known to those skilled in the art. Channel 14 also typically defines a slightly sloping surface along its length to facilitate flow of water in use as a trench drain as is well known to those familiar with such products. It is an advantage of the method and apparatus of the present invention that such a sloping plastic article can be formed from an injection molding process.

Various thermoplastic materials are suitable for use with the injection molding machine 10 and the molding process of the present invention. These thermoplastic materials include, but are not limited to, polyurethane (PU), polystyrene (PS) and polyolefins, such as polypropylene (PP) and polyethylene (PE) including low-density polyethylene (LDPE), high-density polyethylene (HDPE), medium-density polyethylene (MDPE), linear low density polyethylene (LL), and high molecular weight polyethylene (HMW) ethylene/vinyl acetate-copolymers (EVA), ethylene/vinyl alcohol-copolymer (EVAL), ethylene/acrylic acid-copolymers (EAA), ethylene/methyl acrylate-copolymers (EMAC), ethylene methacrylic acid copolymer (EMAA), ethylene vinyl alcohol (EVAL), polyvinyl alcohol (PVOH), ethylene vinyl alcohol carbon monoxide copolymer (EVACO), ethylene butylacrylate (EBAC), polymethyl methacrylate (PMMA) and polyethylene oxide (PEO). It is a particularly advantageous feature of the present invention that such thermoplastic materials can be obtained by grinding or otherwise pulverizing used or waste plastic articles.

Further, various modifying substances can be added to the thermoplastic material 32 before it is fed into the injector unit 12. These modifying substances include fire retardants, smoke suppressants, coloring agents, extenders, plasticizers and lubricants, as is well known to those of ordinary skill of the art. The various modifying substances can be introduced into barrel 20 from individual hoppers, or they can be premixed with the particulate thermoplastic material 32 as a master batch that is fed into the injector unit 18 from hopper 16. The respective modifying substances are preferably added in amounts of between about 0.001 to about 10.0% based upon the weight of the thermoplastic material. Furthermore, such additional substances in the thermoplastic material simply can be particulate contaminants which are present as a result of used or waste plastic articles being ground to provide the particulate thermoplastic starting material for the process of the present invention. In this connection, the apparatus of the present illustration can accommodate particles of non-plastic contaminants having a size of up to about 3/8 inch diameter.

The method and apparatus of the present invention is illustrated further by the following example.

EXAMPLE

Figure 5:
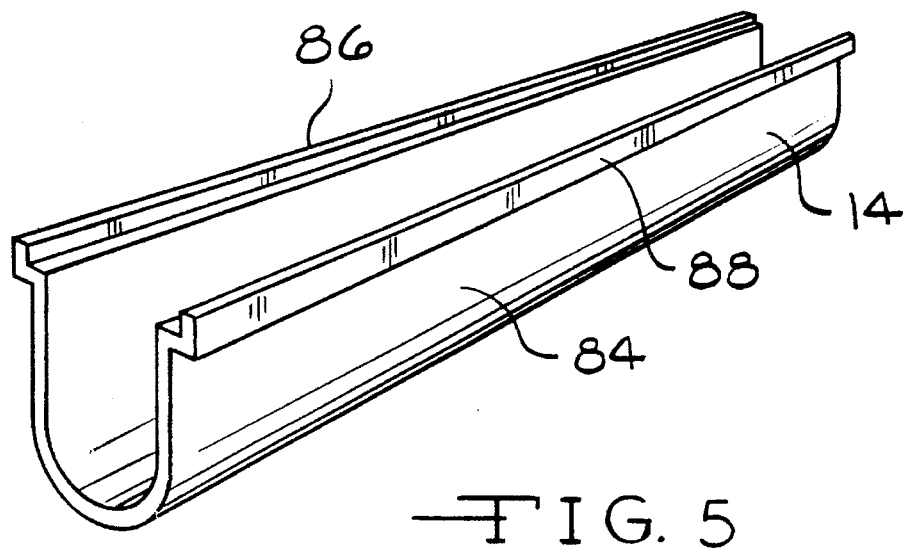
FIG. 5 is a perspective view of an exemplary shaped article made by use of the injection molding machine 10 of the present invention, such as a longitudinally sloping channel 14 for use in a trench drain system.

The method and apparatus of FIGS. 1 to 4 was used to forman article of the type shown in FIG. 5 for use in a trench drain system. The article 14 formed had an overall length of about 79.5 inches, an outer width of about 6 inches measured in the U-portion, an outer height of about 5 inches to about 11 inches measured from the base of the U-portion to the opposite end thereof, and a wall thickness of about 0.5 inches. The resulting article weighed about 27 to 35 pounds.

The injector unit 18 had the following specifications. The inner diameter of barrel 20 measured on surface 24 was about 5.0 inches, and the overall length of barrel 20 was about 15 feet. Screw 22 had a diameter of about 3.75 inches at the proximal end and increasing to about 4.5 inches at the distal end. Flutes 38 had a pitch, i.e. distance between flutes, of about 3 inches and a thickness of about 0.5 inches. The clearance measured between flutes 38 and barrel surface 24 was about 0.25 inches.

A quantity of particulate thermoplastic material in the amount of about 300 pounds was placed in hopper 16. The material was obtained from used plastic articles such as soft drink beverage bottles ground to an average particle size of about 0.375 inches. Engine 40 was operated to rotate screw 22 at a speed of about 30 r.p.m. Burners 60 were operated to provide a temperature of about 475° F. measured at the discharge nozzle 34. The approximate time from the initiation of the process to the end of filling of the mold 12 was about 5 minutes. The thermoplastic material filling mold 12 was allowed to cool for a time of about 5 minutes before mold 12 was opened. The resulting article was considered suitable for use as a component in a trench drain system.

While the present invention has been particularly described in connection with certain specific embodiments thereof, it is to be understood that this is by way of illustration and not limitation, and the scope of the appended claims should be construed as broadly as the prior art will permit.

What is claimed is:

1. A method for forming a shaped article using an injection molding process, which method comprises:

a) providing an injector means comprising a barrel means having an internal passage extending to and meeting with an inlet opening and a discharge opening with a screw means disposed inside the internal passage and in a rotatable relationship with respect to the barrel means, the screw means comprising a shaft having a frusto-conical taper extending outwardly along a longitudinal axis of the shaft from a proximal end to a distal end positioned adjacent to the discharge opening and supporting helically shaped flights that are provided in a spaced relationship with respect to an inner side wall of the barrel means and wherein the helically shaped flights are provided on the shaft in an ascending configuration such that the flights become progressively less pronounced as the shaft tapers towards the distal end while maintaining the spaced relationship with the inner side wall of the barrel means;

b) introducing a particulate thermoplastic material into the injector means;

c) rotating the screw means and moving the thermoplastic material along the inside passage from the inlet opening towards the discharge opening;

d) heating the barrel means of the injector means at an elevated temperature above the melting point of the thermoplastic material thereby forming a molten thermoplastic material tumbling past the flights of the screw means towards the discharge opening, the tumbling action brought about by the spaced relationship between the flights of the screw means and the inner side wall of the barrel means to churn and thereby foam the thermoplastic material as the thermoplastic material moves along the inside passage by action of the rotating screw means;

e) injecting the foamed thermoplastic material into a cavity provided in a mold means, the injection taking place at a relatively low pressure;

f) cooling the foamed thermoplastic material in the mold means to form a shaped article; and g) removing the shaped article from the mold means.

2. The methods of claim 1 wherein the spaced relationship between the flights comprising the screw means and the inside wall of the barrel means ranges between about 0.5 inches to about 0.1875 inches.

3. The method of claim 1 further comprising injecting the molten thermoplastic material into the cavity in the mold means at a pressure of about 250 psi or less.

4. A method for forming a shaped article using an injection molding process, which method comprises:

a) providing an injector means comprising a barrel means having an internal passage extending to and meeting with an inlet opening and a discharge opening with a screw means disposed inside the internal passage and in a rotatable relationship with respect to the barrel means, the screw means comprising a shaft supporting helically shaped flights that are provided in a spaced relationship with respect to an inner side wall of the barrel means;

b) introducing a particulate thermoplastic material into the injector means;

c) rotating the screw means and moving the thermoplastic material along the inside passage from the inlet opening towards the discharge opening;

d) heating the barrel means of the injector means at an elevated temperature above the melting point of the thermoplastic material and at a relatively low pressure of about 250 psi or less thereby forming a molten and continuously foaming thermoplastic material tumbling past the flights of the screw means towards the discharge opening, the continuously foaming characteristic brought about by the tumbling action imparted to the thermoplastic material by the spaced relationship between the flights of the screw means and the inner side wall of the barrel means as the thermoplastic material moves along the inside passage under the action of the rotating screw means;

e) injecting the foamed thermoplastic material into a cavity provided in a mold means, the injection taking place at the relatively low pressure;

f) cooling the foamed thermoplastic material in the mold means to form a shaped article; and g) removing the shaped article from the mold means.

5. The method of claim 4 wherein the spaced relationship between the flights comprising the screw means and the inside wall of the barrel means ranges from between about 0.5 inches to about 0.1875 inches.

6. The method of claim 4 including providing the shaft of the screw means having a frusto-conical taper extending outwardly along a longitudinal axis of the shaft from a proximal end to a distal end positioned adjacent to the discharge opening and further providing the helically shaped flights comprising the screw means on the shaft in an ascending configuration such that the flights become progressively less pronounced as the shaft tapers towards the distal end while maintaining the spaced relationship with the inner side wall of the barrel means.

7. The method of claim 4 further comprising mixing the particulate thermoplastic material with at least one modifying substance selected from the group consisting of an extender, a lubricant, a plasticizer, a fire retardant, a smoke suppressant and coloring agents.

8. The method of claim 7 wherein each of the modifying substances is present in an amount of between about 0.001% to about 10.0% based upon the weight of the thermoplastic material.

9. The method of claim 4 further comprising elevating the temperature of the thermoplastic material in a range of from between about 400° F. to about 500° F.

10. The method of claim 4 further comprising forming the shaped article as a channel means for use in a trench drain system.

11. The method of claim 4 wherein the thermoplastic material is selected from at least one of the members of the group consisting of polyurethance (PU), polystyrene (PS), polypropylene (PP), polyethylene (PE), ethylene/vinyl acetate-copolymers (EVA), ethylene/vinyl alcohol-copolymer (EVAL), ethylene/acrylic acid-copolymers (EAA), ethylene/methyl acrylate-copolymers (EMAC), ethylene methacrylic acid copolymer (EMAA), ethylene vinyl alcohol (EVAL), polyvinyl alcohol (PVOH), ethylene vinyl alcohol carbon monoxide copolymer (EVACO), ethylene butylacrylate (EBAC), polymethyl methacrylate (PMMA), polyethylene oxide (PEO), and mixtures thereof.

12. The method of claim 4 wherein the particulate thermoplastic material comprises waste plastic articles ground or otherwise rendered particulate.

* * * * *